United States Patent
Kong et al.

(10) Patent No.: US 12,548,795 B2
(45) Date of Patent: Feb. 10, 2026

(54) ELECTROLYTE ADDITIVES FOR CAPACITOR-ASSISTED BATTERY

(71) Applicant: GM GLOBAL TECHNOLOGY OPERATIONS LLC, Detroit, MI (US)

(72) Inventors: Dewen Kong, Shanghai (CN); Haijing Liu, Shanghai (CN); Lidan Xing, Guangzhou (CN)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 742 days.

(21) Appl. No.: 17/877,011

(22) Filed: Jul. 29, 2022

(65) Prior Publication Data

US 2023/0411687 A1 Dec. 21, 2023

(30) Foreign Application Priority Data

May 27, 2022 (CN) .......................... 202210587758.4

(51) Int. Cl.
*H01M 10/0567* (2010.01)
*H01G 11/50* (2013.01)
(Continued)

(52) U.S. Cl.
CPC ........ *H01M 10/0567* (2013.01); *H01G 11/50* (2013.01); *H01G 11/58* (2013.01);
(Continued)

(58) Field of Classification Search
CPC ........ H01G 11/03; H01G 11/10; H01G 11/28; H01G 11/46; H01G 11/50; H01G 11/58;
(Continued)

(56) References Cited

U.S. PATENT DOCUMENTS

| 7,535,615 B2 | 5/2009 | Appelfeller et al. |
| 10,319,978 B2 | 6/2019 | Zeng et al. |

(Continued)

FOREIGN PATENT DOCUMENTS

| CN | 113299983 A | * | 8/2021 | ........ H01M 10/0525 |
| CN | 113394443 A | | 9/2021 | |

(Continued)

OTHER PUBLICATIONS

"Liao et al., CN-113299983-A—Translated, Aug. 24, 2021" (Year: 2021).*

(Continued)

*Primary Examiner* — Milton I Cano
*Assistant Examiner* — Jesse J Efymow
(74) *Attorney, Agent, or Firm* — Harness, Dickey & Pierce, P.L.C.

(57) ABSTRACT

A capacitor-assisted battery includes an electrolyte having a lithium-ion conducting component and one or more additives. The one or more additives include a first additive that includes 3-trimethylsilylphenylboronic acid and a second additive that includes succinic anhydride. The capacitor-assisted battery includes an electrode having an electroactive material and a capacitor material. The electroactive material has a first coating defined thereon, and the capacitor material has a second coating defined thereon. The first and second coatings are defined by the first and second additives. The first coating is a substantially continuous coating that covers greater than or equal to about 80% of a total exposed surface area of the electroactive material. The second coating is a discontinuous coating covers greater than or equal to about 20% to less than or equal to about 80% of a total exposed surface area of capacitor material.

18 Claims, 10 Drawing Sheets

(51) Int. Cl.
  *H01G 11/58* (2013.01)
  *H01M 16/00* (2006.01)
  *H01M 4/02* (2006.01)
  *H01M 4/505* (2010.01)
  *H01M 4/525* (2010.01)
  *H01M 10/0525* (2010.01)

(52) U.S. Cl.
  CPC ...... *H01M 16/00* (2013.01); *H01M 2004/028* (2013.01); *H01M 4/505* (2013.01); *H01M 4/525* (2013.01); *H01M 10/0525* (2013.01); *H01M 2300/0025* (2013.01)

(58) Field of Classification Search
  CPC ...... H01G 11/62; H01M 4/131; H01M 4/505; H01M 4/525; H01M 10/0525; H01M 10/0567; H01M 10/0568; H01M 10/0569; H01M 16/00; H01M 2004/028; H01M 2300/0025; H01M 2300/0028; Y02E 60/10

See application file for complete search history.

(56) References Cited

U.S. PATENT DOCUMENTS

| | | | |
|---|---|---|---|
| 10,461,318 B2 | 10/2019 | Zeng et al. | |
| 10,826,139 B2 | 11/2020 | Rich et al. | |
| 11,145,922 B2 | 10/2021 | Li et al. | |
| 11,196,097 B2 | 12/2021 | Gu et al. | |
| 11,239,469 B2 | 2/2022 | Li et al. | |
| 11,295,901 B2 | 4/2022 | Hou et al. | |
| 11,340,299 B2 | 5/2022 | Liu et al. | |
| 11,374,257 B2 | 6/2022 | Hou et al. | |
| 11,393,640 B2 | 7/2022 | Lu et al. | |
| 11,404,714 B2 | 8/2022 | Hou et al. | |
| 2004/0076883 A1* | 4/2004 | Aoshima | H01M 4/525 429/231.1 |
| 2019/0341648 A1 | 11/2019 | Wu et al. | |
| 2019/0372186 A1 | 12/2019 | Kong et al. | |
| 2020/0118770 A1 | 4/2020 | Liu et al. | |
| 2020/0321648 A1 | 10/2020 | Liu et al. | |
| 2021/0050596 A1 | 2/2021 | Li et al. | |
| 2021/0065992 A1 | 3/2021 | Lu et al. | |
| 2021/0065993 A1 | 3/2021 | Liu et al. | |
| 2021/0110979 A1 | 4/2021 | Que et al. | |
| 2021/0110980 A1 | 4/2021 | Su et al. | |
| 2021/0111426 A1 | 4/2021 | Li et al. | |
| 2021/0125791 A1 | 4/2021 | Li et al. | |
| 2021/0135224 A1 | 5/2021 | Hou et al. | |
| 2021/0151260 A1 | 5/2021 | Kong et al. | |
| 2021/0151809 A1 | 5/2021 | Kong et al. | |
| 2021/0351437 A1* | 11/2021 | Kamine | H01M 4/525 |
| 2022/0102756 A1 | 3/2022 | Frieberg et al. | |
| 2022/0181635 A1 | 6/2022 | Kong et al. | |

FOREIGN PATENT DOCUMENTS

| | | |
|---|---|---|
| CN | 117174496 A | 12/2023 |
| DE | 102022117453 B3 | 6/2023 |

OTHER PUBLICATIONS

"Li et al., Achieving a Highly Stable Electrode/Electrolyte Interface for a Nickel-Rich Cathode via an Additive-Containing Gel Polymer Electrolyte, Aug. 4, 2022, ACS Applied Materials & Interfaces, vol. 14" (Year: 2022).*

Chen-Guang Shi et al.; "A special enabler for boosting cyclic life and rate capability of LiNi0.8Co0.1Mn0.1O2: Green and simple additive"; Nano Energy; Aug. 31, 2019; 10 pages.

Christopher Charton, et al.; "Reactivity of Succinic anhydride at Lithium and Graphite Electrodes"; Journal of the Electrochemical Society; May 11, 2017; pp. A1454-A1463.

Vasily Tarnopolskiy et al.; "Beneficial influence of succinic anhydride as electrolyte additive on the self-discharge of 5 V LiNi0.4Mn1.6O4 cathodes"; Journal of Power Sources; Feb. 19, 2013; pp. 39-46.

Chuanlong Wang et al.; U.S. Appl. No. 17/901,298, filed Sep. 1, 2022, entitled "Electrolytes for Electrochemical Cells That Cycle Lithium Ions"; 50 pages.

* cited by examiner

ELECTROLYTE ADDITIVES FOR CAPACITOR-ASSISTED BATTERY

CROSS-REFERENCE TO RELATED APPLICATIONS

This application claims the benefit and priority of Chinese Application No. 202210587758.4 filed May 27, 2022. The entire disclosure of the above application is incorporated herein by reference.

INTRODUCTION

This section provides background information related to the present disclosure which is not necessarily prior art.

Advanced energy storage devices and systems are in demand to satisfy energy and/or power requirements for a variety of products, including automotive products such as start-stop systems (e.g., 12V start-stop systems), micro battery-assisted systems (μBAS), hybrid electric vehicles ("HEVs"), and electric vehicles ("EVs"). For example, capacitors can provide high power density (e.g., about 10 kW/kg) in power-based applications, while lithium-ion batteries can deliver high energy densities (e.g., about 100 Wh/kg-300 Wh/kg). In various instances, capacitor-assisted batteries ("CABs") (e.g., a lithium-ion capacitor hybridized with a lithium-ion battery in a single cell core) can provide several advantages, including enhanced power capabilities when compared with lithium-ion batteries. For example, integrated capacitor materials or super capacitor materials can be used to supply crank current during engine startup, limiting current draw from the lithium-ion battery during start-up, particularly in the instance of cold-weather applications, such as cold-cranking. In certain instances, however, capacitor-assisted systems experience comparatively low energy densities. For example, capacitor-assisted systems often have increased electrolyte requirements as a result of the comparatively large surface area of the capacitor-assisted material and its lower capacity. Further, capacitor-assisted materials can be especially susceptible to undesirable side reactions (e.g., gassing) upon contact with electrolyte solvents. Accordingly, it would be desirable to develop capacitor-assisted batteries or hybrid devices and systems having both enhanced power capabilities and increased energy densities.

SUMMARY

This section provides a general summary of the disclosure and is not a comprehensive disclosure of its full scope or all of its features.

The present disclosure relates to an electrolyte system for capacitor-assisted electrochemical cells.

In various aspects, the present disclosure provides an electrolyte system for a capacitor-assisted battery. The electrolyte system may include a lithium-ion conducting component, greater than or equal to about 0.1 wt. % to less than or equal to about 5 wt. % of a first additive comprising 3-trimethylsilylphenylboronic acid (TMSPB), and greater than or equal to about 0.1 wt. % to less than or equal to about 5 wt. % of a second additive comprising succinic anhydride (SA).

In one aspect, the lithium-ion conducting component may be a lithium salt selected from the group consisting of: lithium hexafluorophosphate ($LiPF_6$), lithium perchlorate ($LiClO_4$), lithium tetrachloroaluminate ($LiAlCl_4$), lithium iodide (LiI), lithium bromide (LiBr), lithium thiocyanate (LiSCN), lithium tetrafluoroborate ($LiBF_4$), lithium tetraphenylborate ($LiB(C_6H_5)_4$), lithium bis(oxalato)borate ($LiB(C_2O_4)_2$) (LiBOB), lithium difluorooxalatoborate ($LiBF_2(C_2O_4)$), lithium hexafluoroarsenate ($LiAsF_6$), lithium trifluoromethanesulfonate ($LiCF_3SO_3$), lithium bis(trifluoromethane)sulfonylimide ($LiN(CF_3SO_2)_2$), lithium bis(fluorosulfonyl)imide ($LiN(FSO_2)_2$) (LiSFI), lithium bis(trifluoromethanesulfonyl)imide (LiTFSI), and combinations thereof.

In one aspect, the electrolyte system may have a lithium salt concentration greater than or equal to about 0.6 M to less than or equal to about 2.0 M.

In one aspect, the electrolyte system may further include a solvent selected from the group consisting of: ethylene carbonate (EC), propylene carbonate (PC), butylene carbonate (BC), fluoroethylene carbonate (FEC), dimethyl carbonate (DMC), diethyl carbonate (DEC), ethyl methyl carbonate (EMC), methyl formate, methyl acetate, methyl propionate, γ-butyrolactone, γ-valerolactone, and combinations thereof.

In various aspects, the present disclosure provides a capacitor-assisted battery. The capacitor-assisted battery may include a capacitor-assisted electrode. The capacitor-assisted electrode includes, for example, a capacitor material and an electroactive material that cycles lithium ions. The capacitor-assisted electrode may further includes an electrolyte system. The electrolyte system may include a lithium-ion conducting component, 3-trimethylsilylphenylboronic acid (TMSPB), and succinic anhydride (SA). The 3-trimethylsilylphenylboronic acid (TMSPB) and the succinic anhydride (SA) may together define a first coating on the electroactive material and a second coating on the capacitor material.

In one aspect, the electrolyte system may include greater than or equal to about 0.1 wt. % to less than or equal to about 5 wt. % of the 3-trimethylsilylphenylboronic acid (TMSPB), and greater than or equal to about 0.1 wt. % to less than or equal to about 5 wt. % of the succinic anhydride (SA)

In one aspect, the first coating may be a substantially continuous that covers greater than or equal to about 80%, of a total exposed surface area of the electroactive material.

In one aspect, the first coating may have an average thickness greater than or equal to about 1 nm to less than or equal to about 100 nm.

In one aspect, the second coating may be a discontinuous coating having a plurality of pores.

In one aspect, the second coating may cover greater than or equal to about 20% to less than or equal to about 80% of a total exposed surface area of capacitor material.

In one aspect, the second coating may have an average thickness greater than or equal to about 1 nm to less than or equal to about 500 nm.

In one aspect, the lithium-ion conducting component may be a lithium salt selected from the group consisting of: lithium hexafluorophosphate ($LiPF_6$), lithium perchlorate ($LiClO_4$), lithium tetrachloroaluminate ($LiAlCl_4$), lithium iodide (LiI), lithium bromide (LiBr), lithium thiocyanate (LiSCN), lithium tetrafluoroborate ($LiBF_4$), lithium tetraphenylborate ($LiB(C_6H_5)_4$), lithium bis(oxalato)borate ($LiB(C_2O_4)_2$) (LiBOB), lithium difluorooxalatoborate ($LiBF_2(C_2O_4)$), lithium hexafluoroarsenate ($LiAsF_6$), lithium trifluoromethanesulfonate ($LiCF_3SO_3$), lithium bis(trifluoromethane)sulfonylimide ($LiN(CF_3SO_2)_2$), lithium bis(fluorosulfonyl)imide ($LiN(FSO_2)_2$) (LiSFI), lithium bis(trifluoromethanesulfonyl)imide (LiTFSI), and combinations thereof.

In one aspect, the electrolyte system may have a lithium salt concentration greater than or equal to about 0.6 M to less than or equal to about 2.0 M.

In one aspect, the electrolyte system may further include a solvent selected from the group consisting of: ethylene carbonate (EC), propylene carbonate (PC), butylene carbonate (BC), fluoroethylene carbonate (FEC), dimethyl carbonate (DMC), diethyl carbonate (DEC), ethyl methyl carbonate (EMC), methyl formate, methyl acetate, methyl propionate, γ-butyrolactone, γ-valerolactone, and combinations thereof.

In one aspect, the electroactive material may be a positive electroactive material.

In one aspect, the positive electroactive material may be selected from the group consisting of: $LiNi_xMn_yCo_zAl_{(1-x-y-z)}O_2$ (where $0.33 \leq x \leq 0.96$, $0.03 \leq y \leq 0.33$, $0.005 \leq z \leq 0.33$), $LiNi_xMn_yCo_{1-x-y}O_2$ (where $0.33 \leq x \leq 0.96$ and $0.04 \leq y \leq 0.33$), $LiNi_xMn_{1-x}O_2$ (where $0 \leq x \leq 1$), and combinations thereof.

In various aspects, the present disclosure provides a capacitor-assisted battery. The capacitor-assisted battery may include an electrolyte system. The electrolyte system may include a lithium-ion conducting component, a first additive, and a second additive. The first additive may include 3-trimethylsilylphenylboronic acid (TMSPB). The second additive may include succinic anhydride (SA). The capacitor-assisted battery may also include a capacitor-assisted electrode. The capacitor-assisted electrode may include an electroactive material having a first coating defined thereon, and a capacitor material having a second coating defined thereon. The first and second coatings may be defined by the first and second additives. The first coating may be a substantially continuous that covers greater than or equal to about 80%, of a total exposed surface area of the electroactive material. The second coating may be a discontinuous coating covers greater than or equal to about 20% to less than or equal to about 80% of a total exposed surface area of capacitor material.

In one aspect, the electrolyte system may include greater than or equal to about 0.1 wt. % to less than or equal to about 5 wt. % of the first additive, and greater than or equal to about 0.1 wt. % to less than or equal to about 5 wt. % of the second additive.

In one aspect, the lithium-ion conducting component may include a lithium salt. The electrolyte system may have a lithium salt concentration greater than or equal to about 0.6 M to less than or equal to about 2.0 M.

In one aspect, the first coating may have an average thickness greater than or equal to about 1 nm to less than or equal to about 100 nm. The second coating may have an average thickness greater than or equal to about 1 nm to less than or equal to about 500 nm.

Further areas of applicability will become apparent from the description provided herein. The description and specific examples in this summary are intended for purposes of illustration only and are not intended to limit the scope of the present disclosure.

BRIEF DESCRIPTION OF THE DRAWINGS

The drawings described herein are for illustrative purposes only of selected embodiments and not all possible implementations, and are not intended to limit the scope of the present disclosure.

Corresponding reference numerals indicate corresponding parts throughout the several views of the drawings.

DETAILED DESCRIPTION

Figure 1:
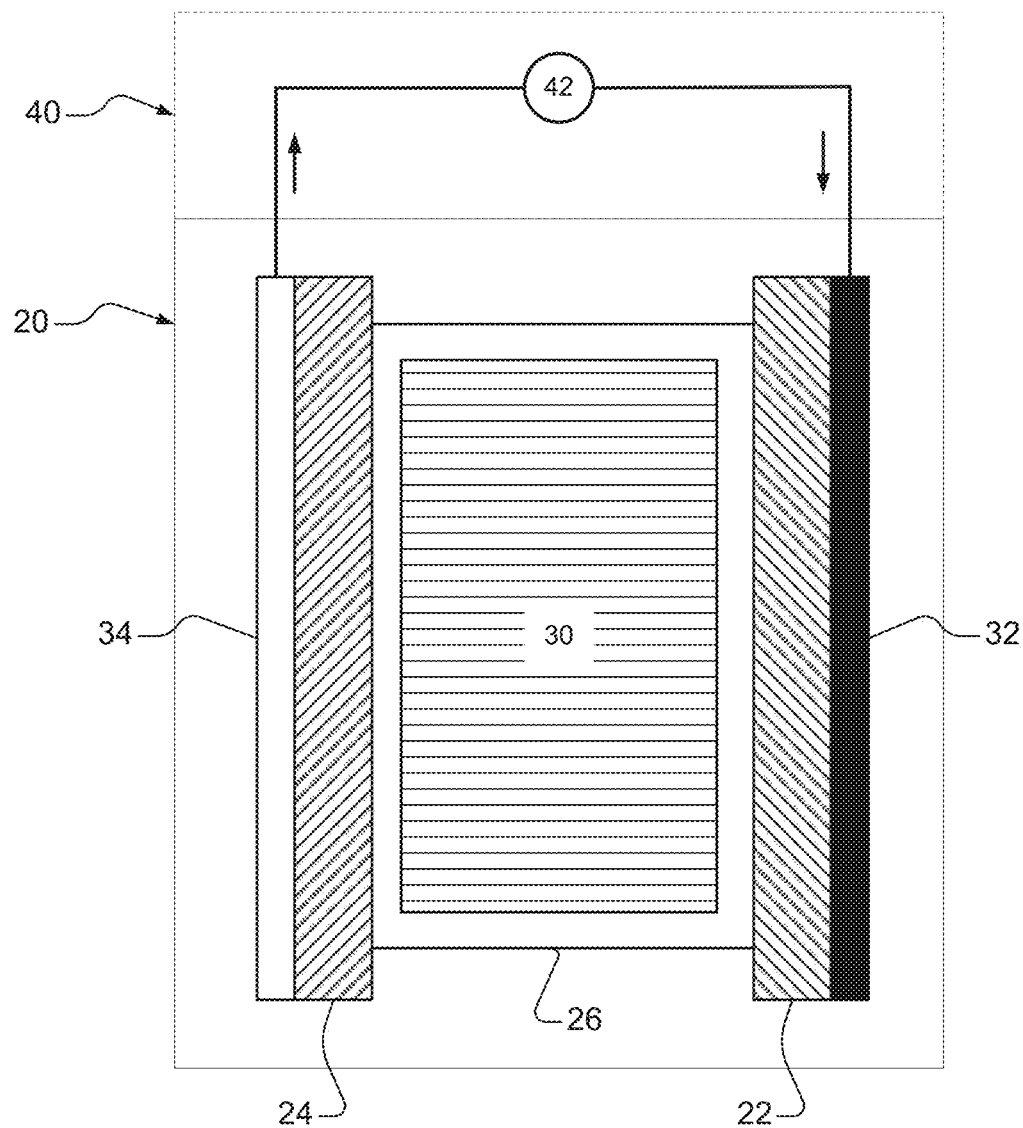
FIG. 1 is an illustration of an example capacitor-assisted electrochemical battery including first and second electrolyte additives in accordance with various aspects of the present disclosure.

Example embodiments are provided so that this disclosure will be thorough, and will fully convey the scope to those who are skilled in the art. Numerous specific details are set forth such as examples of specific compositions, components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, elements, compositions, steps, integers, operations, and/or components, but do not preclude the presence or addition of one or more other features, integers, steps, operations, elements, components, and/or groups thereof. Although the open-ended term "comprising," is to be understood as a non-restrictive term used to describe and claim various embodiments set forth herein, in certain aspects, the term may alternatively be understood to instead be a more limiting and restrictive term, such as "consisting of" or "consisting essentially of." Thus, for any given embodiment reciting compositions, materials, components, elements, features, integers, operations, and/or process steps, the present disclosure also specifically includes embodiments consisting of, or consisting essentially of, such recited compositions, materials, components, elements, features, integers, operations, and/or process steps. In the case of "consisting of," the alternative embodiment excludes any additional compositions, materials, components, elements, features, integers, operations, and/or process steps, while in the case of "consisting essentially of," any additional compositions, materials, components, elements, features, integers, operations, and/or process steps that materially affect the basic and novel characteristics are excluded from such an embodiment, but any compositions, materials, components, elements, features, integers, operations, and/or process steps that do not materially affect the basic and novel characteristics can be included in the embodiment.

Any method steps, processes, and operations described herein are not to be construed as necessarily requiring their performance in the particular order discussed or illustrated, unless specifically identified as an order of performance. It is also to be understood that additional or alternative steps may be employed, unless otherwise indicated.

When a component, element, or layer is referred to as being "on," "engaged to," "connected to," or "coupled to" another element or layer, it may be directly on, engaged, connected, or coupled to the other component, element, or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various steps, elements, components, regions, layers and/or sections, these steps, elements, components, regions, layers and/or sections should not be limited by these terms, unless otherwise indicated. These terms may be only used to distinguish one step, element, component, region, layer or section from another step, element, component, region, layer, or section. Terms such as "first," "second," and other numerical terms when used herein do not imply a sequence or order unless clearly indicated by the context. Thus, a first step, element, component, region, layer, or section discussed below could be termed a second step, element, component, region, layer, or section without departing from the teachings of the example embodiments.

Spatially or temporally relative terms, such as "before," "after," "inner," "outer," "beneath," "below," "lower," "above," "upper," and the like, may be used herein for ease of description to describe one element or feature's relationship to another element(s) or feature(s) as illustrated in the figures. Spatially or temporally relative terms may be intended to encompass different orientations of the device or system in use or operation in addition to the orientation depicted in the figures.

Throughout this disclosure, the numerical values represent approximate measures or limits to ranges to encompass minor deviations from the given values and embodiments having about the value mentioned as well as those having exactly the value mentioned. Other than in the working examples provided at the end of the detailed description, all numerical values of parameters (e.g., of quantities or conditions) in this specification, including the appended claims, are to be understood as being modified in all instances by the term "about" whether or not "about" actually appears before the numerical value. "About" indicates both exactly or precisely the stated numerical value, and also, that the stated numerical value allows some slight imprecision (with some approach to exactness in the value; approximately or reasonably close to the value; nearly). If the imprecision provided by "about" is not otherwise understood in the art with this ordinary meaning, then "about" as used herein indicates at least variations that may arise from ordinary methods of measuring and using such parameters. For example, "about" may comprise a variation of less than or equal to 5%, optionally less than or equal to 4%, optionally less than or equal to 3%, optionally less than or equal to 2%, optionally less than or equal to 1%, optionally less than or equal to 0.5%, and in certain aspects, optionally less than or equal to 0.1%.

In addition, disclosure of ranges includes disclosure of all values and further divided ranges within the entire range, including endpoints and sub-ranges given for the ranges.

Example embodiments will now be described more fully with reference to the accompanying drawings.

The present technology pertains to improved electrochemical cells that include one or more capacitor components or additives and that may be incorporated into energy storage devices, for example lithium-ion batteries. Such electrochemical cells may have hybrid structures, so as to integrate the high power density of capacitors with the high energy density of lithium-ion batteries. In various instances the electrochemical cells and energy storage devices prepared in accordance with various aspects of the present disclosure may be used in, for example, in vehicle or automotive transportation applications (e.g., motorcycles, boats, tractors, buses, motorcycles, mobile homes, campers, and tanks). However, the present technology may be employed in a wide variety of other industries and applications, including aerospace components, consumer goods, devices, buildings (e.g., houses, offices, sheds, and warehouses), office equipment and furniture, and industrial equipment machinery, agricultural or farm equipment, or heavy machinery, by way of non-limiting example.

Typical lithium-ion battery includes a first electrode (such as a positive electrode or cathode) opposing a second electrode (such as a negative electrode or anode) and a separator and/or electrolyte disposed therebetween. Often, in a lithium-ion battery pack, batteries or cells may be electrically connected in a stack or winding configuration to increase overall output. Lithium-ion batteries operate by reversibly passing lithium ions between the first and second electrodes. For example, lithium ions may move from a positive electrode to a negative electrode during charging of the battery, and in the opposite direction when discharging the battery. The electrolyte is suitable for conducting lithium ions and may be in liquid, gel, or solid form.

In the instance of hybridized or capacitor-assisted batteries ("CABs"), a capacitor material that serves a capacitor function may be integrated into the lithium-ion battery or cell stack. For example, in various aspects, the capacitor-assisted batteries may include one or more capacitor components or layers that are parallel or stacked with the one or more of the electrodes of the conventional lithium-ion battery. In other aspects, capacitor-assisted batteries may include one or more capacitor materials or additives incorporated within one or more of the electrodes of the conventional lithium-ion battery. In each variation, the capacitor-assisted batteries provide several advantages including, for example, enhanced energy densities (Wh/kg) and power densities (W/kg), as well as improved long-term performance. For example, energy density may be improved be selecting appropriate electroactive materials, while power density may be improved by incorporating varying amounts of a capacitor component or materials.

An exemplary and schematic illustration of a capacitor-assisted electrochemical cell (also referred to as the battery or battery cell) 20 is shown in FIG. 1. The battery 20 includes a negative electrode 22 (e.g., anode), a positive electrode 24 (e.g., cathode), and a separator 26 disposed between the two electrodes 22, 24. The separator 26 provides electrical separation—prevents physical contact—between the electrodes 22, 24. The separator 26 also provides a minimal resistance path for internal passage of lithium ions, and in certain instances, related anions, during cycling of the lithium ions. In various aspects, the separator 26 comprises an electrolyte 30 that may, in certain aspects, also be present in the negative electrode 22 and positive electrode 24. In certain variations, the separator 26 may be formed by a solid-state electrolyte or a semi-solid-state electrolyte (e.g., gel electrolyte). For example, the separator 26 may be defined by a plurality of solid-state electrolyte particles. In the instance of solid-state batteries and/or semi-solid-state batteries, the positive electrode 24 and/or the negative electrode 22 may include a plurality of solid-state electrolyte particles. The plurality of solid-state electrolyte particles included in, or defining, the separator 26 may be the same as or different from the plurality of solid-state electrolyte particles included in the positive electrode 24 and/or the negative electrode 22.

A first current collector 32 (e.g., a negative current collector) may be positioned at or near the negative electrode 22. The first current collector 32 may be a metal foil, metal grid or screen, or expanded metal comprising copper or any other appropriate electronically conductive material known to those of skill in the art. A second current collector 34 (e.g., a positive current collector) may be positioned at or near the positive electrode 24. The second electrode current collector 34 may be a metal foil, metal grid or screen, or expanded metal comprising aluminum or any other appropriate electronically conductive material known to those of skill in the art. The first current collector 32 and the second current collector 34 may respectively collect and move free electrons to and from an external circuit 40. For example, an interruptible external circuit 40 and a load device 42 may connect the negative electrode 22 (through the first current collector 32) and the positive electrode 24 (through the second current collector 34).

The battery 20 can generate an electric current during discharge by way of reversible electrochemical reactions that occur when the external circuit 40 is closed (to connect the negative electrode 22 and the positive electrode 24) and the negative electrode 22 has a lower potential than the positive electrode. The chemical potential difference between the positive electrode 24 and the negative electrode 22 drives electrons produced by a reaction, for example, the oxidation of intercalated lithium, at the negative electrode 22 through the external circuit 40 toward the positive electrode 24. Lithium ions that are also produced at the negative electrode 22 are concurrently transferred through the electrolyte 30 contained in the separator 26 toward the positive electrode 24. The electrons flow through the external circuit 40 and the lithium ions migrate across the separator 26 containing the electrolyte 30 to form intercalated lithium at the positive electrode 24. As noted above, the electrolyte 30 is typically also present in the negative electrode 22 and positive electrode 24. The electric current passing through the external circuit 40 can be harnessed and directed through the load device 42 until the lithium in the negative electrode 22 is depleted and the capacity of the battery 20 is diminished.

The battery 20 can be charged or re-energized at any time by connecting an external power source to the lithium ion battery 20 to reverse the electrochemical reactions that occur during battery discharge. Connecting an external electrical energy source to the battery 20 promotes a reaction, for example, non-spontaneous oxidation of intercalated lithium, at the positive electrode 24 so that electrons and lithium ions are produced. The lithium ions flow back toward the negative electrode 22 through the electrolyte 30 across the separator 26 to replenish the negative electrode 22 with lithium (e.g., intercalated lithium) for use during the next battery discharge event. As such, a complete discharging event followed by a complete charging event is considered to be a cycle, where lithium ions are cycled between the positive electrode 24 and the negative electrode 22. The external power source that may be used to charge the battery 20 may vary depending on the size, construction, and particular end-use of the battery 20. Some notable and exemplary external power sources include, but are not limited to, an alternating current-direct current (AC-DC) converter connected to an alternating current electrical power grid though a wall outlet and a motor vehicle alternator.

Although the illustrated example includes a single cathode (i.e., positive electrode 24) and a single anode (i.e., negative electrode 22), the skilled artisan will recognize that the present teachings extend to various other configurations, including those having one or more cathodes and one or more anodes, as well as various current collectors with electroactive layers disposed on or adjacent to one or more surfaces thereof. For example, in many lithium-ion battery configurations, each of the first current collector 32, negative electrode 22, separator 26, positive electrode 24, and second current collector 34 are prepared as relatively thin layers (for example, from several microns to a fraction of a millimeter or less in thickness) and assembled in layers connected in electrical parallel arrangement to provide a suitable electrical energy and power package.

The size and shape of the battery 20 may vary depending on the particular application for which it is designed. For example, battery-powered vehicles and hand-held consumer electronic devices are two examples where the battery 20 would most likely be designed to different size, capacity, and power-output specifications. The battery 20 may be connected in series or parallel with other similar lithium-ion cells or batteries to produce a greater voltage output, energy, and power if it is required by the load device 42. Accordingly, the battery 20 can generate electric current to a load device 42 that is part of the external circuit 40. The load device 42 may be powered by the electric current passing through the external circuit 40 when the battery 20 is discharging. While the electrical load device 42 may be any number of known electrically-powered devices, a few specific examples include an electric motor for an electrified vehicle, a laptop computer, a tablet computer, a cellular phone, and cordless power tools or appliances. The load device 42 may also be an electricity-generating apparatus that charges the battery 20 for purposes of storing electrical energy.

In various aspects, the battery 20 may also include a variety of other components that, while not depicted here, are nonetheless known to those of skill in the art. For instance, the battery 20 may include a casing, gaskets, terminal caps, tabs, battery terminals, and any other conventional components or materials that may be situated within the battery 20, including between or around the negative electrode 22, the positive electrode 24, and/or the separator 26. Further still, although the battery 20 shown in FIG. 1 includes a liquid electrolyte 30, as noted above, the present technology also applies to solid-state batteries and/or semi-solid state batteries that include solid-state electrolytes and/or solid-state electrolyte particles and/or semi-solid electrolytes and/or solid-state electroactive particles that may have different designs as known to those of skill in the art.

With renewed reference to FIG. 1, the negative electrode 22 may be formed from a lithium host material that is capable of functioning as a negative terminal of the battery 20. In various aspects, the negative electrode 22 may be defined by a plurality of negative electroactive material particles. Such negative electroactive material particles may be disposed in one or more layers so as to define the three-dimensional structure of the negative electrode 22. For example, the negative electrode 22 may have an average thickness greater than or equal to about 1 µm to less than or equal to about 500 µm, and in certain aspects, optionally greater than or equal to about 10 µm to less than or equal to about 200 µm. The electrolyte 30 may be introduced, for example after cell assembly, and contained within pores of the negative electrode 22. In certain variations, the negative electrode 22 may include a plurality of solid-state electrolyte particles.

The negative electrode 22 may include a negative electroactive material that comprises lithium, such as, for example, lithium alloys (e.g., lithium titanium oxide (LTO)) and/or lithium metal. In certain variations, the negative electrode may be a film or layer formed of lithium metal. Other materials can also be used to form the negative electrode 22, including, for example, carbonaceous materials (such as, graphite, hard carbon, soft carbon), and/or lithium-silicon, silicon containing binary and ternary alloys (e.g., Si, Li—Si, $SiO_x$ (where $0≤x≤2$), FeS, and the like), and/or tin-containing alloys (e.g., Si—Sn, SiSnFe, SiSnAl, SiFeCo, $SnO_2$, and the like), and/or metal oxides (e.g., $Li_4Ti_5O_{12}$, $V_2O_5$, $SnO_2$, $Co_3O_4$, and the like), and/or combinations thereof. For example, in certain variations, the negative electroactive material may include a carbonaceous-silicon based composite including, for example, about 10 wt. % $SiO_x$ (where $0≤x≤2$) and about 90 wt. % graphite. Further still, in certain variation, the negative electroactive material may be pre-lithiated.

In various aspects, the negative electroactive material in the negative electrode 22 may be optionally intermingled (e.g., slurry cast) with one or more electronically conductive materials that provide an electron conductive path and/or at least one polymeric binder material that improves the structural integrity of the negative electrode 22. For example, the negative electrode 22 may include greater than or equal to about 10 wt. % to less than or equal to about 99 wt. %, and in certain aspects, optionally greater than or equal to about 60 wt. % to less than or equal to about 99 wt. %, of the negative electroactive material; greater than or equal to 0 wt. % to less than or equal to about 40 wt. %, and in certain aspects, optionally greater than or equal to about 0.5 wt. % to less than or equal to about 20 wt. %, of the electronically conducting material; and greater than or equal to 0 wt. % to less than or equal to about 40 wt. %, and in certain aspects, optionally greater than or equal to about 0.5 wt. % to less than or equal to about 20 wt. %, of the at least one polymeric binder.

Example polymeric binders include polyimide, polyamic acid, polyamide, polysulfone, polyvinylidene difluoride (PVdF), polyvinylidene difluoride (PVdF) copolymers, polytetrafluoroethylene (PTFE), polytetrafluoroethylene (PTFE) copolymers, polyacrylic acid, blends of polyvinylidene fluoride and polyhexafluoropropene, polychlorotrifluoroethylene, ethylene propylene diene monomer (EPDM) rubber, carboxymethyl cellulose (CMC), a nitrile butadiene rubber (NBR), styrene-butadiene rubber (SBR), lithium polyacrylate (LiPAA), sodium polyacrylate (NaPAA), sodium alginate, and/or lithium alginate. Electronically conducting materials may include carbon-based materials, powdered nickel or other metal particles, or a conductive polymer. Carbon-based materials may include, for example, particles of graphite, acetylene black (such as KETCHEN™ black or DENKA™ black), carbon nanofibers and nanotubes (e.g., single wall carbon nanotubes (SWCNT), multi-wall carbon nanotubes (MWCNT)), graphene (e.g., graphene platelets (GNP), oxidized graphene platelets), conductive carbon blacks (such as, SuperP (SP)), and the like. Examples of a conductive polymer include polyaniline, polythiophene, polyacetylene, polypyrrole, and the like.

The separator 26 may be a microporous polymeric separator. The microporous polymeric separator may include, for example, a polyolefin. The polyolefin may be a homopolymer (derived from a single monomer constituent) or a heteropolymer (derived from more than one monomer constituent), which may be either linear or branched. If a heteropolymer is derived from two monomer constituents, the polyolefin may assume any copolymer chain arrangement, including those of a block copolymer or a random copolymer. Similarly, if the polyolefin is a heteropolymer derived from more than two monomer constituents, it may likewise be a block copolymer or a random copolymer. In certain aspects, the polyolefin may be polyethylene (PE), polypropylene (PP), or a blend of polyethylene (PE) and polypropylene (PP), or multi-layered structured porous films of polyethylene (PE) and/or polypropylene (PP). Commercially available polyolefin porous separator membranes 26 include CELGARD® 2500 (a monolayer polypropylene separator) and CELGARD® 2320 (a trilayer polypropylene/polyethylene/polypropylene separator) available from Celgard LLC.

When the separator 26 is a microporous polymeric separator, it may be a single layer or a multi-layer laminate, which may be fabricated from either a dry or a wet process. For example, in certain instances, a single layer of the polyolefin may form the entire separator 26. In other aspects, the separator 26 may be a fibrous membrane having an abundance of pores extending between the opposing surfaces and may have an average thickness of less than a millimeter, for example. As another example, however, multiple discrete layers of similar or dissimilar polyolefins may be assembled to form the microporous polymer separator 26. The separator 26 may also comprise other polymers in addition to the polyolefin such as, but not limited to, polyethylene terephthalate (PET), polyvinylidene fluoride (PVdF), a polyamide, polyimide, poly(amide-imide) copolymer, polyetherimide, and/or cellulose, or any other material suitable for creating the required porous structure. The polyolefin layer, and any other optional polymer layers, may further be included in the separator 26 as a fibrous layer to help provide the separator 26 with appropriate structural and porosity characteristics.

Various conventionally available polymers and commercial products for forming the separator 26 are contemplated, as well as the many manufacturing methods that may be employed to produce such a microporous polymer separator 26. In each instance, the separator 26 may have an average thickness greater than or equal to about 1 µm to less than or equal to about 50 µm, and in certain instances, optionally greater than or equal to about 1 µm to less than or equal to about 20 µm. Also, in each variation, the separator 26 may further include one or more ceramic materials and/or one or more heat-resistant materials. For example, the separator 26 may also be admixed with the one or more ceramic materials and/or the one or more heat-resistant materials, or one or more surfaces of the separator 26 may be coated with the one or more ceramic materials and/or the one or more heat-resistant materials. The one or more ceramic materials may include, for example, alumina ($Al_2O_3$), silica ($SiO_2$), and the like. The heat-resistant material may include, for example, Nomex, Aramid, and the like.

In various aspects, the porous separator 26 and/or the electrolyte 30 disposed in the porous separator 26 as illustrated in FIG. 1 may be replaced with a solid-state electrolyte ("SSE") layer and/or semi-solid-state electrolyte (e.g., gel) layer that functions as both an electrolyte and a separator. The solid-state electrolyte layer and/or semi-solid-state electrolyte layer may be disposed between the positive electrode 24 and negative electrode 22. The solid-state electrolyte layer and/or semi-solid-state electrolyte layer facilitates transfer of lithium ions, while mechanically separating and providing electrical insulation between the negative and positive electrodes 22, 24. By way of non-limiting example, the solid-state electrolyte layer and/or semi-solid-state electrolyte layer may include a plurality of solid-state electrolyte particles, such as $LiTi_2(PO_4)_3$, $LiGe_2(PO_4)_3$, $Li_7La_3Zr_2O_{12}$, $Li_{3-x}La_{2/3-x}TiO_3$, $Li_3PO_4$, $Li_3N$, $Li_4GeS_4$, $Li_{10}GeP_2S_{12}$, $Li_2S$—$P_2S_5$, $Li_6PS_5Cl$, $Li_6PS_5Br$, $Li_6PS_5I$, $Li_3OCl$, $Li_{2.99}Ba_{0.005}ClO$, or combinations thereof. The solid-state electrolyte layer and/or semi-solid-state electrolyte layer may also include gel polymer electrolytes (polymer films with absorbed liquid electrolyte). Examples of the polymers include polyvinylidene difluoride, polyethylene glycol, polyacrylonitrile, poly(methyl methacrylate), their copolymers or combinations therefor.

The positive electrode 24 may be formed from a lithium-based active material that is capable of undergoing lithium intercalation and deintercalation, alloying and dealloying, or plating and stripping, while functioning as the positive terminal of the battery 20. The positive electrode 24 can be defined by a plurality of electroactive material particles. Such positive electroactive material particles may be disposed in one or more layers so as to define the three-dimensional structure of the positive electrode 24. For example, the positive electrode 24 may have a thickness greater than or equal to about 1 µm to less than or equal to about 500 µm, and in certain aspects, optionally greater than or equal to about 10 µm to less than or equal to about 200 µm. The electrolyte 30 may be introduced, for example after cell assembly, and contained within pores of the positive electrode 24. For example, in certain variations, the positive electrode 24 may include a plurality of solid-state electrolyte particles.

In various aspects, the positive electroactive material may be an olivine compound (e.g., $LiV_2(PO_4)_3$ $LiFePO_4$, $LiCoPO_4$, $LiMn_xFe_{1-x}PO_4$ (LMFP) (where $0.4 \leq x \leq 0.8$), and the like); layered oxides having, for example, the general formula $LiNi_xMn_yCo_zAl_{(1-x-y-z)}O_2$ (where $0.33 \leq x \leq 0.96$, $0.03 \leq y \leq 0.33$, $0.005 \leq z \leq 0.33$), $LiNi_xMn_yCo_{1-x-y}O_2$ (where $0.33 \leq x \leq 0.96$ and $0.04 \leq y \leq 0.33$), or $LiNi_xMn_{1-x}O_2$ (where $0 \leq x \leq 1$) and including, for example, $LiCoO_2$, $LiNiO_2$, $LiMnO_2$, $LiNi_{0.5}Mn_{0.5}O_2$, $LiNi_{0.75}Mn_{0.25}O_2$, NMC111, NMC523, NMC622, NMC721, NMC811, NCA, NCMA, NMA, and the like; spinel compounds (e.g., $LiMn_2O_4$, $LiNi_{0.5}Mn_{1.5}O_4$, and the like); tavorite compounds (e.g., $LiVPO_4F$ and the like); borate compounds (e.g., $LiFeBO_3$, $LiCoBO_3$, $LiMnBO_3$, and the like); silicate compounds (e.g., $Li_2FeSiO_4$, $Li_2MnSiO_4$, $LiMnSiO_4F$, and the like); organic compounds (e.g., dilithium (2,5-dilithiooxy)terephthalate, polyimide, and the like), and combinations thereof.

In various aspects, the positive electrode 24 is a capacitor-assisted electrode including, for example, greater than or equal to about 0.1 wt. % to less than or equal to about 80 wt. %, and in certain aspects, optionally greater than or equal to about 3 wt. % to less than or equal to about 24 wt. %, of a capacitor material. Although not illustrated, the skilled artisan will understand that in other variations, the negative electrode 22 may include a capacitor material in addition to or instead of the positive electrode 24. The skill artisan will also understand that in certain variations the battery may include a capacitor layer in addition to or in place of the positive electrode 24 and/or the negative electrode 22.

In each variation, the capacitor materials may be selected from the group consisting of: cobalt oxide ($Co_3O_4$), manganese oxide ($MnO_2$), iridium oxide ($IrO_2$), niobium pentoxide ($Nb_2O_5$), ruthenium oxide ($RuO_2$), tantalum pentoxide ($Ta_2O_5$), tin oxide ($SnO_2$), vanadium oxide ($V_2O_5$), titanium disulfide ($TiS_2$), copper sulfide (CuS), iron sulfide (FeS), activated carbon (AC), graphene, graphite, mesoporous carbon, macroporous carbon, single-walled carbon nanotubes, multi-walled carbon nanotubes, carbon aerogels, activated carbon fiber cloth, polyaniline, poly acetylene, poly(3,4-ethylenedioxythiophene), poly(3,4-ethylenedioxythiophene), poly(4-styrenesulfonate), and combinations thereof. Preferably, in certain variations, the capacitor materials may be selected from the group consisting of: activated carbon (AC), graphene, graphite, mesoporous carbon, macroporous carbon, single-walled carbon nanotubes, multi-walled carbon nanotubes, carbon aerogels, and combinations thereof. Notably, the capacitor material has a comparatively large surface area (e.g., greater than about 100 $m^2/g$, and in certain aspects, optionally about 1600 $m^2/g$) as compared to the positive electroactive material (e.g., about or less than 10 $m^2/g$).

In each variation, the positive electrode 24 may be optionally intermingled (e.g., slurry cast) with one or more electronically conductive materials that provide an electron conductive path and/or at least one polymeric binder material that improves the structural integrity of the positive electrode 24. For example, the positive electrode 24 may include greater than or equal to about 10 wt. % to less than or equal to about 99 wt. %, and in certain aspects, optionally greater than or equal to about 60 wt. % to less than or equal to about 95 wt. %, of the positive electroactive material; greater than or equal to 0 wt. % to less than or equal to about 40 wt. %, and in certain aspects, optionally greater than or equal to about 0.5 wt. % to less than or equal to about 10 wt. %, of the electronically conducting material; and greater than or equal to 0 wt. % to less than or equal to about 40 wt. %, and in certain aspects, optionally greater than or equal to about 0.5 wt. % to less than or equal to about 10 wt. %, of the at least one polymeric binder.

The positive electrode 24, the negative electrode 22, and the separator 26 may each include an electrolyte solution or system 30 inside their pores, capable of conducting lithium ions between the negative electrode 22 and the positive electrode 24. Any appropriate electrolyte 30, whether in a solid, liquid, or gel form, capable of conducting lithium ions between the negative electrode 22 and the positive electrode 24 may be used in the lithium-ion battery 20. In each variation, however, the electrolyte 30 includes one or more electrolyte additives. For example, the electrolyte may include greater than or equal to about 0.1 wt. % to less than or equal to about 5 wt. %, greater than or equal to about 0.1 wt. % to less than or equal to about 3 wt. %, greater than or equal to about 0.1 wt. % to less than or equal to about 1 wt. %, and in certain aspects, greater than or equal to about 0.1 wt. % to less than or equal to about 0.5 wt. %, of a first electrolyte additive; and greater than or equal to about 0.1 wt. % to less than or equal to about 5 wt. %, greater than or equal to about 0.1 wt. % to less than or equal to about 3 wt. %, greater than or equal to about 0.1 wt. % to less than or equal to about 1 wt. %, and in certain aspects, greater than or equal to about 0.1 wt. % to less than or equal to about 0.5 wt. %, of a second electrolyte additive. The first electrolyte additive may include 3-trimethylsilylphenylboronic acid (TMSPB), and the second electrolyte additive may include succinic anhydride (SA).

Figure 2A:
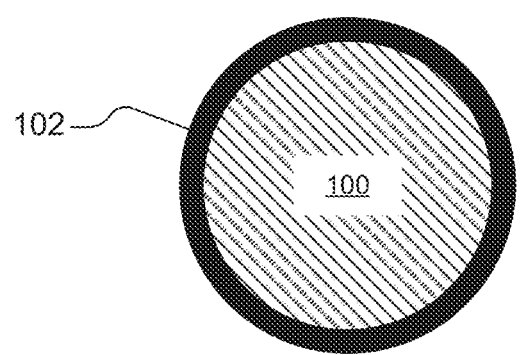
FIG. 2A is an illustration of a positive electroactive material having a cathode electrolyte interphase layer formed thereon in accordance with various aspects of the present disclosure.
Figure 2B:
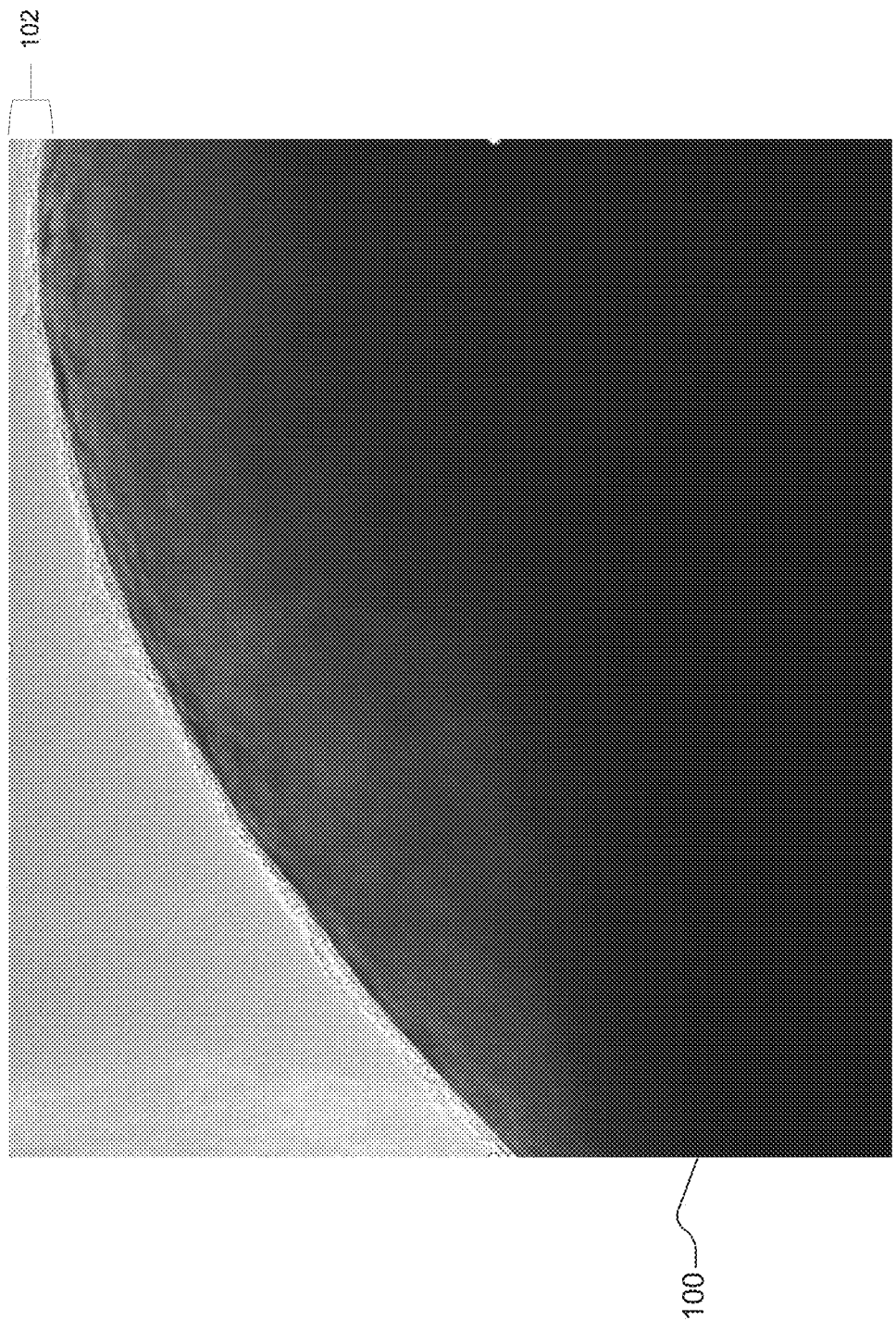
FIG. 2B is a transmission electron microscopy (TEM) image of an example positive electroactive material having a cathode electrolyte interphase layer formed thereon in accordance with various aspects of the present disclosure.

The one or more additives may be selected so as to improve hot temperature durability of the capacitor-assisted battery 20. For example, the one or more additives may help to reduce or suppress side reactions between the active particles (including, for example, the positive electroactive material particles and the capacitor additive) and the electrolyte 30. For example, during a first or formation cycle and/or following high temperature (e.g., about 55° C.) cycles, the first and second additives may together form a first cathode electrolyte interphase (CEI) layer or film 102 on exposed surfaces of the positive electroactive material 100 (for example, as illustrated in FIGS. 2A and 2B), and a second cathode electrolyte interphase layer 112 on exposed surfaces of the capacitor additive 110 (for example, as illustrated in FIG. 2B). The succinic anhydride may contribute to the robustness of the first and second cathode electrolyte interphase layers 102, 112, while as a conductive material the 3-trimethylsilylphenylboronic acid reduces the impedance of the first and second cathode electrolyte interphase layers.

As illustrated in FIG. 2A, the first cathode electrolyte interphase layer 102 may be substantially continuous covering, for example, greater than or equal to about 80%, optionally greater than or equal to about 85%, optionally greater than or equal to about 90%, optionally greater than or equal to about 95%, optionally greater than or equal to about 96%, optionally greater than or equal to about 97%, optionally greater than or equal to about 98%, optionally greater than or equal to about 99%, optionally greater than or equal to about 99.5%, and in certain aspects, optionally greater than or equal to about 99.8%, of a total exposed surface area of the positive electroactive material 100. The first cathode electrolyte interphase layer 102 may have an average thickness greater than or equal to about 1 nm to less than or equal to about 100 nm, and in certain aspects, optionally greater than or equal to about 1 nm to less than or equal to about 20 nm. FIG. 2B is a microscopy image of the first cathode electrolyte interphase layer 102 on exposed surfaces of the positive electroactive material 100.

Figure 3A:
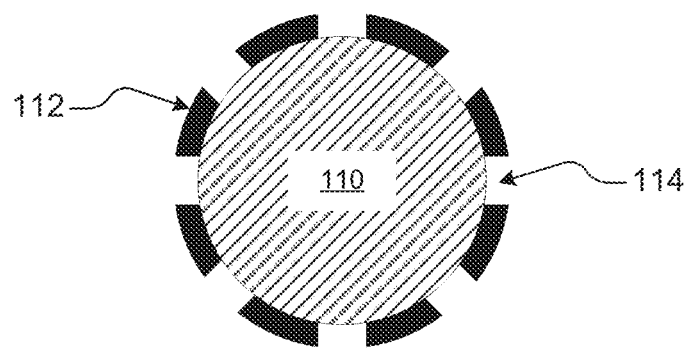
FIG. 3A is an illustration of a capacitor material having a cathode electrolyte interphase layer formed thereon in accordance with various aspects of the present disclosure.
Figure 3B:
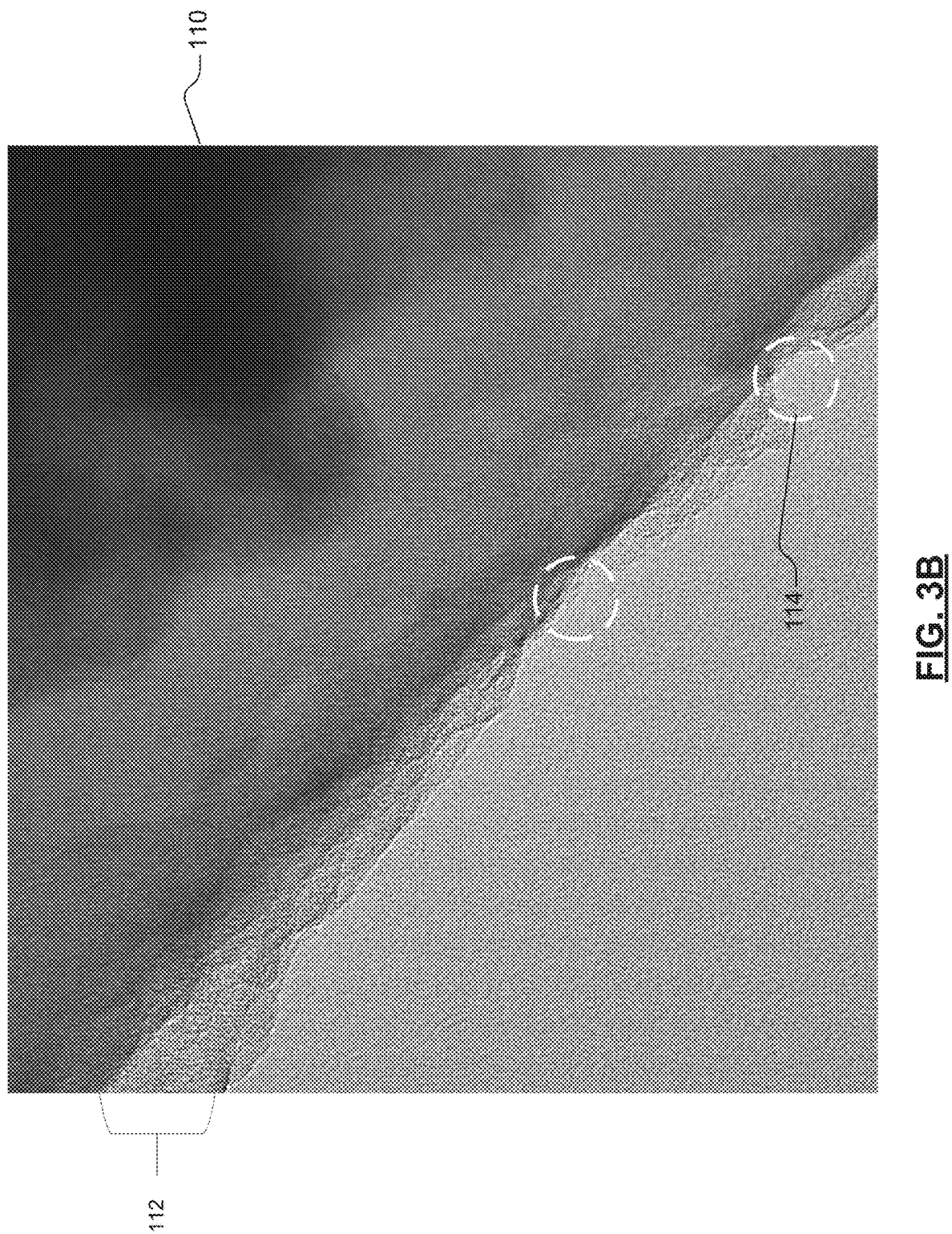
FIG. 3B is a transmission electron microscopy (TEM) image of a capacitor material having a cathode electrolyte interphase layer formed thereon in accordance with various aspects of the present disclosure.

As illustrated in FIG. 3A, as a result of the comparatively larger surface area of the capacitor additive, and the larger number of functional groups, the second cathode electrolyte interphase layer 112 may be a discontinuous coating having a plurality of pores 114. For example, the second cathode electrolyte interphase layer 112 covering greater than or equal to about 20% to less than or equal to about 80% of a total exposed surface area of the capacitor additive 110. The discontinuous coating of the second cathode electrolyte interphase layer 112 reserves open sites for anion adsorption/desorption so as to maintain the pulse power capability of the capacitor additive 110. The second cathode electrolyte interphase layer 112 may have an average thickness greater than or equal to about 1 nm to less than or equal to about 500 nm, and in certain aspects, optionally greater than or equal to about 1 nm to less than or equal to about 100 nm. FIG. 3B is a microscopy image of the second cathode electrolyte interphase 112 on exposed surfaces of the capacitor additive 110. FIG. 3B is a microscopy image of the second cathode electrolyte interphase layer 102 on exposed surfaces of the capacitor additive 110.

With renewed reference to FIG. 1, in certain variations, the electrolyte 30 may be a non-aqueous liquid electrolyte solution that includes, in addition to the one or more electrolyte additives, a lithium salt dissolved in an organic solvent or a mixture of organic solvents. The electrolyte 30 may have a salt concentration greater than or equal to about 0.6 M to less than or equal to about 2.0 M, and in certain aspects, optionally about 1.0 M.

A non-limiting list of lithium salts that may be dissolved in an organic solvent to form the non-aqueous liquid electrolyte solution include lithium hexafluorophosphate ($LiPF_6$), lithium perchlorate ($LiClO_4$), lithium tetrachloroaluminate ($LiAlCl_4$), lithium iodide (LiI), lithium bromide (LiBr), lithium thiocyanate (LiSCN), lithium tetrafluoroborate ($LiBF_4$), lithium tetraphenylborate ($LiB(C_6H_5)_4$), lithium bis(oxalato)borate ($LiB(C_2O_4)_2$) (LiBOB), lithium difluorooxalatobroate ($LiBF_2(C_2O_4)$), lithium hexafluoroarsenate ($LiAsF_6$), lithium trifluoromethanesulfonate ($LiCF_3SO_3$), lithium bis(trifluoromethane)sulfonylimide ($LiN(CF_3SO_2)_2$), lithium bis(fluorosulfonyl)imide ($LiN(FSO_2)_2$) (LiSFI), lithium bis(trifluoromethanesulfonyl)imide (LiTFSI), and combinations thereof.

These and other similar lithium salts may be dissolved in a variety of non-aqueous aprotic organic solvents, including but not limited to, various alkyl carbonates, such as cyclic carbonates (e.g., ethylene carbonate (EC), propylene carbonate (PC), butylene carbonate (BC), fluoroethylene carbonate (FEC)), linear carbonates (e.g., dimethyl carbonate (DMC), diethyl carbonate (DEC), ethyl methyl carbonate (EMC)), aliphatic carboxylic esters (e.g., methyl formate, methyl acetate, methyl propionate), γ-lactones (e.g., γ-butyrolactone, γ-valerolactone), and combinations thereof. For example, in certain variations, the electrolyte 30 may include a mass ratio of ethyl methyl carbonate (EMC):ethylene carbonate (EC):diethyl carbonate (DEC) of about 3:5:2.

Certain features of the current technology are further illustrated in the following non-limiting examples.

Example 1

Example battery cells may be prepared in accordance with various aspects of the present disclosure.

For example, an example battery cell 410 may include an electrolyte that has one or more additive including, for example, a first electrolyte additive including 3-trimethylsilylphenylboronic acid (TMSPB), and a second electrolyte additive including include succinic anhydride (SA). A comparative battery cell 420 may include a similar electrolyte that omits the one or more additives.

Figure 4A:
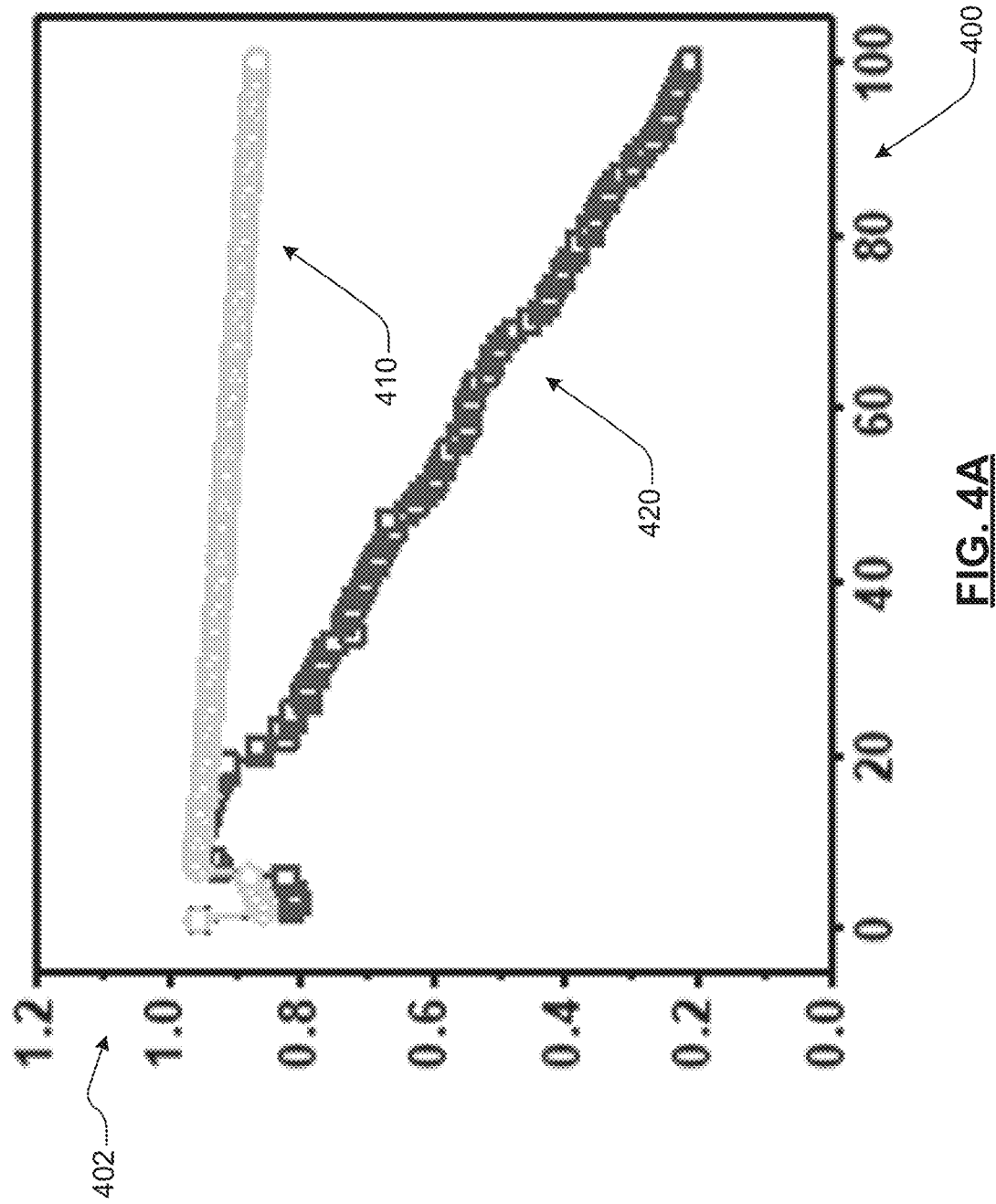
FIG. 4A is a graphical illustration demonstrating capacity retention of an example battery cell including first and second electrolyte additives in accordance with various aspects of the present disclosure.

FIG. 4A is a graphical illustration demonstrating the cycle performance of the example battery cell 410 at about 55° C., where the x-axis 400 represents cycle number, and the y-axis 402 represents capacity (mAh). As illustrated, the example battery cell 410 has improved performance as compared to the comparative battery cell 420. In particular, the example battery cell 410 has about 70% improvement in capacity retention after 100 cycles at 1C rate.

Figure 4B:
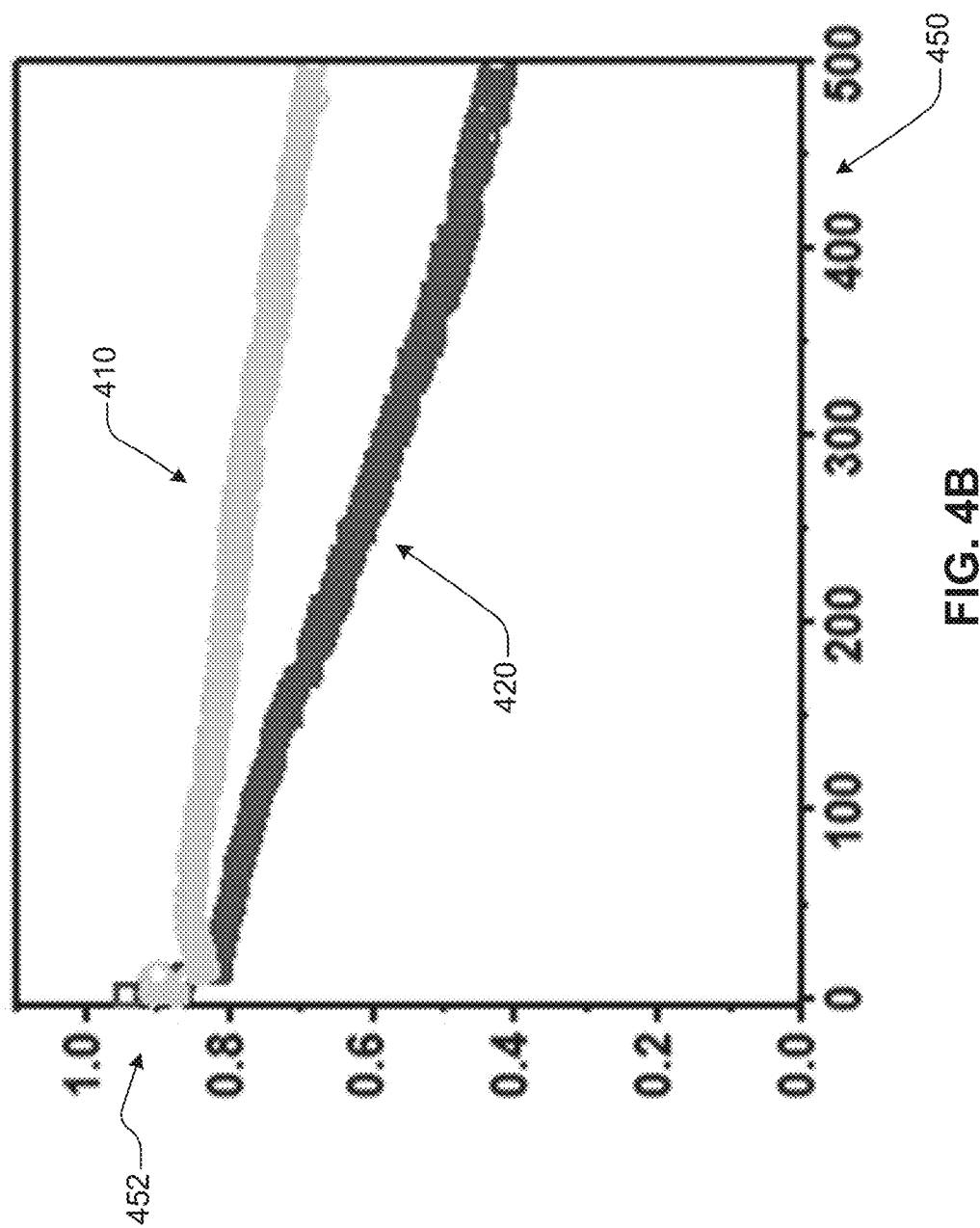
FIG. 4B is a graphical illustration demonstrating capacity retention of an example battery cell including first and second electrolyte additives in accordance with various aspects of the present disclosure.

FIG. 4B is a graphical illustration demonstrating the cycle performance of the example battery cell 410 at about 25° C., where the x-axis 450 represents cycle number, and the y-axis 452 represents capacity (mAh). As illustrated, the example battery cell 410 has improved performance as compared to the comparative battery cell 420. In particular, the example battery cell 410 has about 30% improvement in capacity retention after 500 cycles at 3C rate.

Figure 5A:
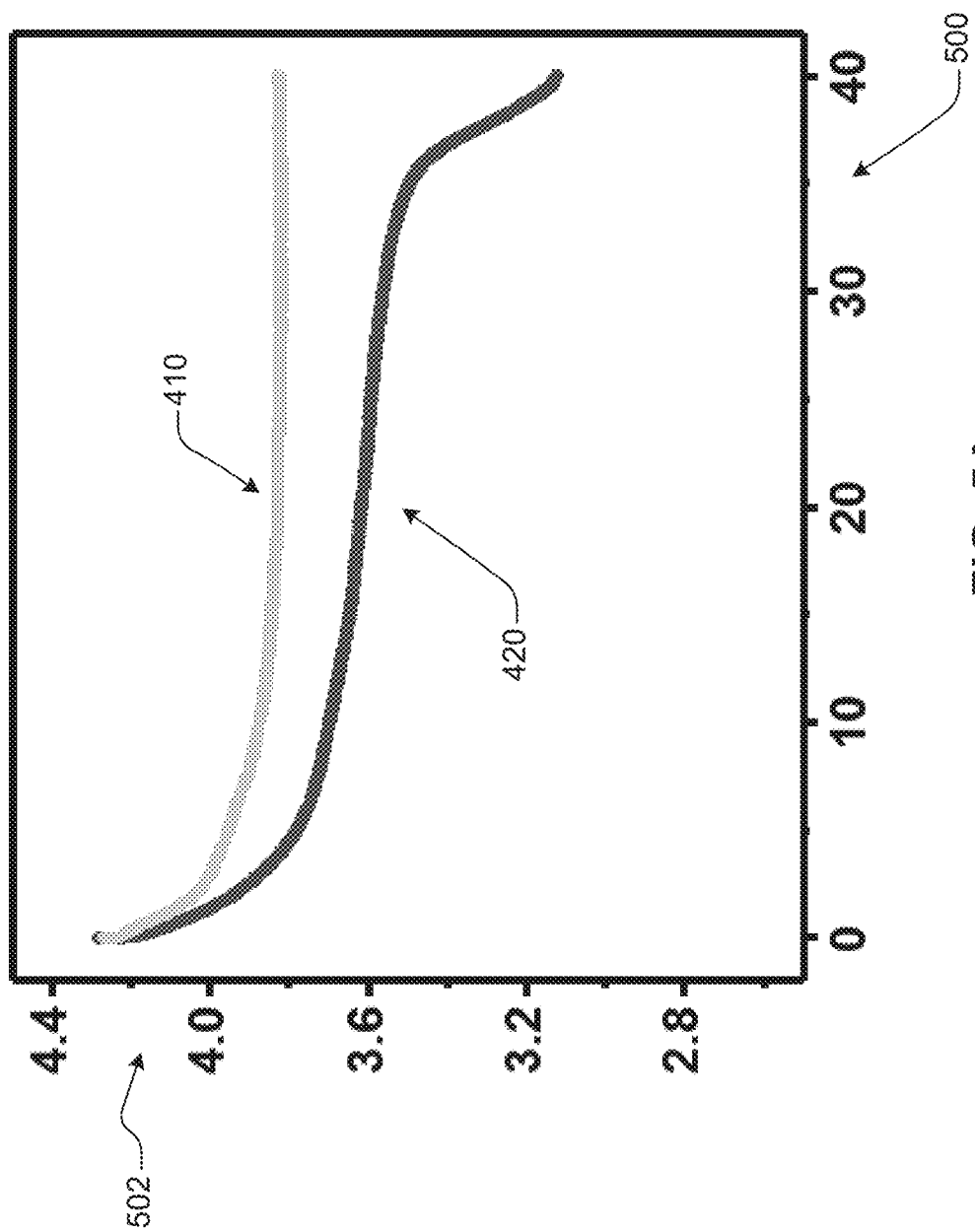
FIG. 5A is a graphical illustration demonstrating a self-discharge test of an example battery cell including first and second electrolyte additives in accordance with various aspects of the present disclosure.

FIG. 5A is a graphical illustration reflecting a self-discharge test for the example battery cell 410 at about 25° C., where the x-axis 500 represents time (day), and the y-axis 502 represents voltage (V). As illustrated, the example battery cell 410 maintains a steady and higher voltage for about forty days, which is attributed to the protective cathode electrolyte interphase layer, and consequently, improved performance (i.e., fewer side reactions) as compared to the comparative battery cell 420.

Figure 5B:
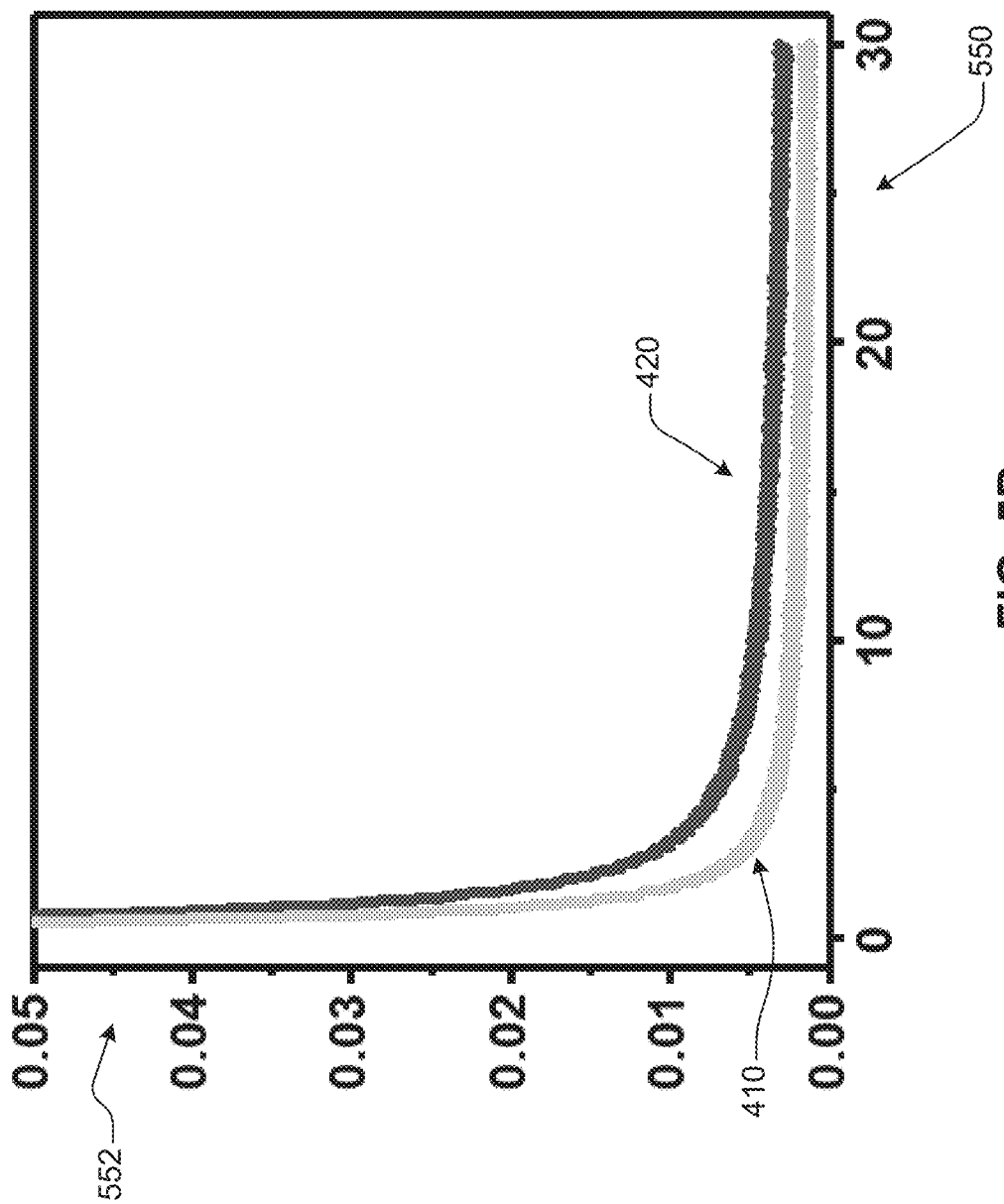
FIG. 5B is a graphical illustration demonstrating current response of an example battery cell including first and second electrolyte additives in accordance with various aspects of the present disclosure.

FIG. 5B is a graphical illustration demonstrating current response of the example battery cell 410 at about 100% state of charge (SOC) and at about 25° C., where the x-axis 550 represents time (hours), and the y-axis 552 represents current (mA). As illustrated, the example battery cell 410 has improved residue current, which is lower as compared to the comparative battery cell 420. As the skilled artisan will recognized, the lower residue current, the fewer side reactions.

Figure 5C:
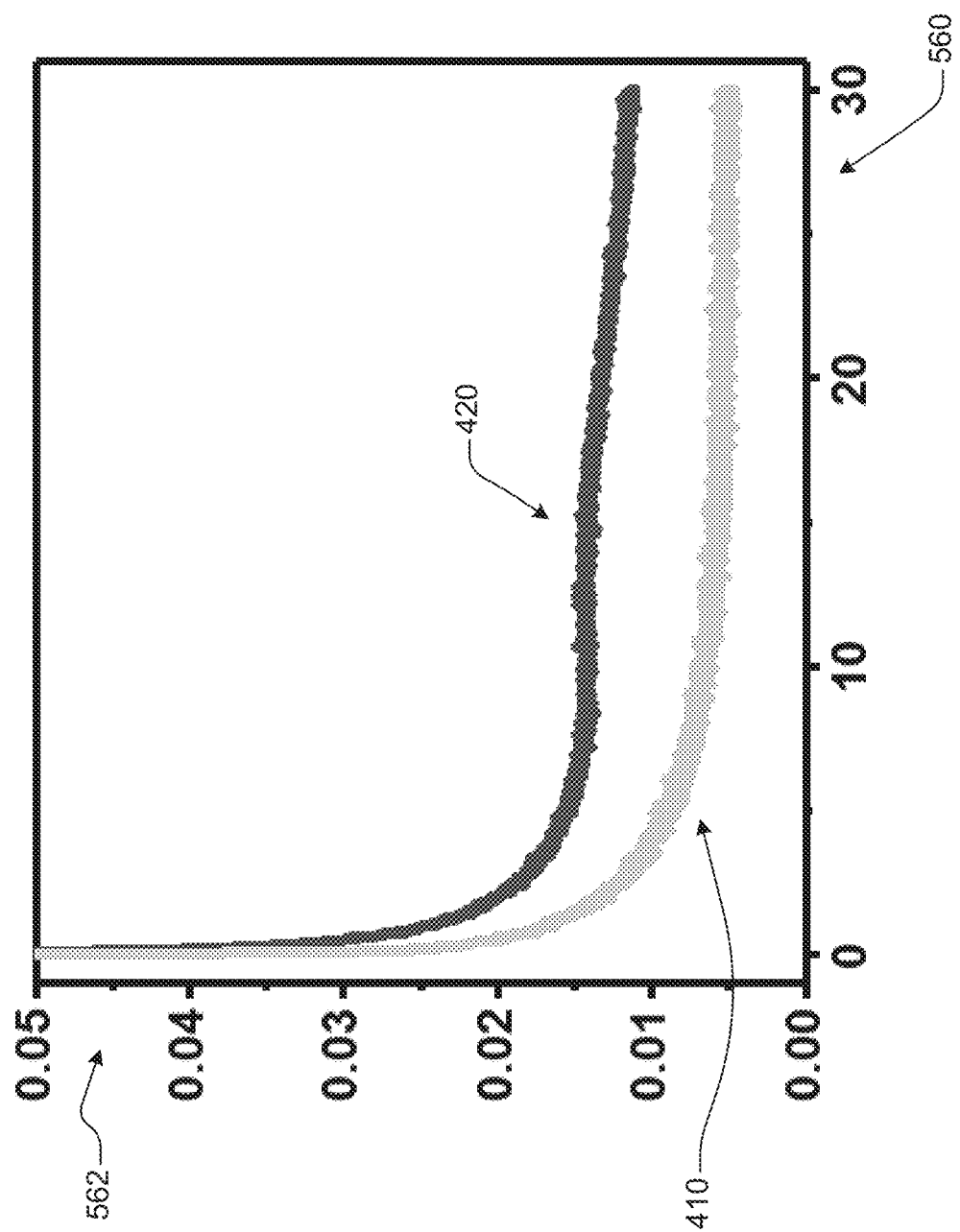
FIG. 5C is a graphical illustration demonstrating current response of an example battery cell including first and second electrolyte additives in accordance with various aspects of the present disclosure.

FIG. 5C is a graphical illustration demonstrating current response of the example battery cell 410 at about 100% state of charge (SOC) and at about 55° C., where the x-axis 560 represents time (hours), and the y-axis 562 represents current (mA). As illustrated, the example battery cell 410 presents much lower response current as compared to the comparative battery cell 420.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. An electrolyte for a capacitor-assisted battery, the electrolyte comprising:
    a lithium-ion conducting component;
    greater than or equal to 2 wt. % to less than or equal to 5 wt. % of a first additive comprising 3-trimethylsilylphenylboronic acid; and
    greater than or equal to 1 wt. % to less than or equal to 5 wt. % of a second additive comprising succinic anhydride.

2. The electrolyte of claim 1, wherein the lithium-ion conducting component is a lithium salt selected from the group consisting of: lithium hexafluorophosphate, lithium perchlorate, lithium tetrachloroaluminate, lithium iodide, lithium bromide, lithium thiocyanate, lithium tetrafluoroborate, lithium tetraphenylborate, lithium bis(oxalato)borate, lithium difluorooxalatoborate, lithium hexafluoroarsenate, lithium trifluoromethanesulfonate, lithium bis(trifluoromethane)sulfonylimide, lithium bis(fluorosulfonyl)imide, lithium bis(trifluoromethanesulfonyl)imide, and combinations thereof.

3. The electrolyte of claim 2, wherein the electrolyte has a lithium salt concentration greater than or equal to about 0.6 M to less than or equal to about 2.0 M.

4. The electrolyte of claim 1, wherein the electrolyte further comprises a solvent selected from the group consisting of: ethylene carbonate, propylene carbonate, butylene carbonate, fluoroethylene carbonate, dimethyl carbonate, diethyl carbonate, ethyl methyl carbonate, methyl formate, methyl acetate, methyl propionate, γ-butyrolactone, γ-valerolactone, and combinations thereof.

5. A capacitor-assisted battery comprising:
    a capacitor-assisted electrode, the capacitor-assisted electrode comprising a capacitor material and an electroactive material that cycles lithium ions; and
    an electrolyte comprising:
        a lithium-ion conducting component;
        greater than or equal to 2 wt. % to less than or equal to 5 wt. % of 3-trimethylsilylphenylboronic acid; and
        greater than or equal to 1 wt. % to less than or equal to 5 wt. % succinic anhydride,
        the 3-trimethylsilylphenylboronic acid and the succinic anhydride together defining a first coating on the electroactive material and a second coating on the capacitor material.

6. The capacitor-assisted battery of claim 5, wherein the first coating is a substantially continuous that covers greater than or equal to about 80% of a total exposed surface area of the electroactive material.

7. The capacitor-assisted battery of claim 5, wherein the first coating has an average thickness greater than or equal to about 1 nanometer to less than or equal to about 100 nanometers.

8. The capacitor-assisted battery of claim 5, wherein the second coating is a discontinuous coating having a plurality of pores.

9. The capacitor-assisted battery of claim 8, wherein the second coating covers greater than or equal to about 20% to less than or equal to about 80% of a total exposed surface area of capacitor material.

10. The capacitor-assisted battery of claim 5, wherein the second coating has an average thickness greater than or equal to about 1 nanometer to less than or equal to about 500 nanometers.

11. The capacitor-assisted battery of claim 5, wherein the lithium-ion conducting component is a lithium salt selected from the group consisting of: lithium hexafluorophosphate, lithium perchlorate, lithium tetrachloroaluminate, lithium iodide, lithium bromide, lithium thiocyanate, lithium tetrafluoroborate, lithium tetraphenylborate, lithium bis(oxalato)borate, lithium difluorooxalatoborate, lithium hexafluoroarsenate, lithium trifluoromethanesulfonate, lithium bis(trifluoromethane)sulfonylimide, lithium bis(fluorosulfonyl)imide, lithium bis(trifluoromethanesulfonyl)imide, and combinations thereof.

12. The capacitor-assisted battery of claim 11, wherein the electrolyte has a lithium salt concentration greater than or equal to about 0.6 M to less than or equal to about 2.0 M.

13. The capacitor-assisted battery of claim 5, wherein the electrolyte further comprises a solvent selected from the group consisting of: ethylene carbonate, propylene carbonate, butylene carbonate, fluoroethylene carbonate, dimethyl carbonate, diethyl carbonate, ethyl methyl carbonate, methyl formate, methyl acetate, methyl propionate, γ-butyrolactone, γ-valerolactone, and combinations thereof.

14. The capacitor-assisted battery of claim 5, wherein the electroactive material is a positive electroactive material.

15. The capacitor-assisted battery of claim 14, wherein the positive electroactive material is selected from the group consisting of: $LiNi_xMn_yCo_zAl_{(1-x-y-z)}O_2$ (where $0.33 \leq x \leq 0.96$, $0.03 \leq y \leq 0.33$, $0.005 \leq z \leq 0.33$), $LiNi_xMn_yCo_{1-x-y}O_2$ (where $0.33 \leq x \leq 0.96$ and $0.04 \leq y \leq 0.33$), $LiNi_xMn_{1-x}O_2$ (where $0 \leq x \leq 1$), and combinations thereof.

16. A capacitor-assisted battery comprising:
    an electrolyte comprising:
        a lithium-ion conducting component;
        greater than or equal to 2 wt. % to less than or equal to 5 wt. % of a first additive comprising 3-trimethylsilylphenylboronic acid; and
        greater than or equal to 1 wt. % to less than or equal to 5 wt. % of a second additive comprising succinic anhydride; and
    a capacitor-assisted electrode comprising:
        an electroactive material having a first coating defined thereon, the first coating being a substantially continuous that covers greater than or equal to about 80%, of a total exposed surface area of the electroactive material, the first coating defined by the first and second additives; and
        a capacitor material having a second coating defined thereon, the second coating being a discontinuous coating covers greater than or equal to about 20% to less than or equal to about 80% of a total exposed surface area of capacitor material, the second coating also defined by the first and second additives.

17. The capacitor-assisted battery of claim 16, wherein
the lithium-ion conducting component comprises a lithium salt, and
the electrolyte has a lithium salt concentration greater than or equal to about 0.6 M to less than or equal to about 2.0 M.

18. The capacitor-assisted battery of claim 16, wherein
the first coating has an average thickness greater than or equal to about 1 nanometer to less than or equal to about 100 nanometers, and
the second coating has an average thickness greater than or equal to about 1 nanometer to less than or equal to about 500 nanometers.

\* \* \* \* \*